F. G. FARR.
HYDRAULIC OIL STORAGE AND DELIVERY SYSTEM.
APPLICATION FILED JAN. 19, 1918.

1,286,973. Patented Dec. 10, 1918.

Inventor
Frederick G. Farr

By Whittemore Hulbert & Whittemore
Attorneys

UNITED STATES PATENT OFFICE.

FREDERICK G. FARR, OF DETROIT, MICHIGAN, ASSIGNOR TO HYDRAULIC OIL SYSTEMS CORPORATION, OF DETROIT, MICHIGAN, A CORPORATION OF MICHIGAN.

HYDRAULIC OIL STORAGE AND DELIVERY SYSTEM.

1,286,973.     Specification of Letters Patent.     Patented Dec. 10, 1918.

Application filed January 19, 1918. Serial No. 212,624.

*To all whom it may concern:*

Be it known that I, FREDERICK G. FARR, a citizen of the United States of America, residing at Detroit, in the county of Wayne and State of Michigan, have invented certain new and useful Improvements in Hydraulic Oil Storage and Delivery Systems, of which the following is a specification, reference being had therein to the accompanying drawings.

The invention relates to hydraulic systems for the storage and delivery of oils, and has particular reference to a construction for converting a tank designed for another system into a hydraulic system. To this end the invention comprises the features of construction as hereinafter set forth.

Figure 1:
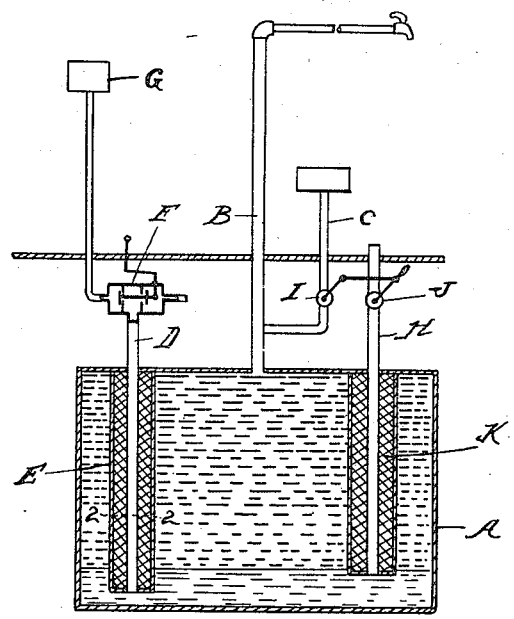
Figure 1 is a diagram showing my improvement.
Figure 2:
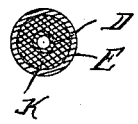
Fig. 2 is a cross section on line 2—2 of Fig. 1.

In the installation of hydraulic systems it is usual to bury the tank in the ground or to otherwise place it where it will be protected from freezing temperature. With apparatus designed for this purpose it is usual to attach the displacement connection to the bottom of the tank and to form therein a trap, which also, as well as the water connections leading thereto, is buried in the ground and protected from the frost. When, however, an old tank is to be adapted for a hydraulic system it is difficult to make connections to the bottom thereof, and therefore such connections are more conveniently introduced through the top. It has been found, however, where the water connections are introduced through the top that freezing frequently occurs. This is for the reason that the oil for filling the tank during transit may be subjected to low temperature, and when it is placed in the tank and surrounds the water pipes passing therethrough heat will be absorbed from said pipes, causing the water therein to freeze. With the present invention I have overcome this difficulty by placing around the portion of the water conduits passing through the body of the tank heat insulation, which will slow the rate of transfer of heat from the water to the oil. Thus, when low temperature oil is placed in the tank heat will be absorbed from the ground or from the atmosphere from the room in which it is placed, which will raise the temperature to above the freezing point, and during this interval while this heat absorption is taking place the water pipes will be protected from freezing. Furthermore where the system is in use, the change of water in the pipes occurring whenever oil is delivered will raise the temperature, and it is therefore only necessary to slow the rate of conduction by means of heat insulation so as to prevent a too rapid absorption of heat from the water.

As illustrated A is the tank, B is the oil delivery pipe connected to the upper portion of the tank, C is the fill connection and D is the water displacement pipe which is inserted through the tank A from the upper end thereof and extends to within a short distance of the bottom. Surrounding this pipe is another pipe E, this being of sufficient diameter to leave a space either filled with air or with some heat insulating material. F is the control valve for the delivery of water into the pipe D from the tank G or other water head.

In filling the tank A it is necessary to avoid displacing the water below the lower end of the pipe D, as this would permit the oil to rise through said pipe into the valve F and be discharged into the sewer. As it is not feasible to place a trap in this pipe, such as used on tanks designed for hydraulic systems, I have provided a tell-tale or indicator which will warn the person who is filling the tank when it is sufficiently filled. This telltale comprises a pipe H which also is introduced from the top of the tank and extends toward the bottom thereof but terminates at an elevation slightly above the lower end of the pipe D. The upper end of the pipe H is at an elevation above the hydrostatic head of the water when the valve F is opened to discharge during the filling of the tank with oil. At the same time the elevation of the upper end of the pipe H is less than that of the oil head balanced by the water head in filling position. As a consequence when the oil is forced down below the lower end of the pipe H it will permit the water in said pipe to be displaced by oil and this will be forced up to above the upper end of the pipe, and, flowing out from the same, will call the operator's attention to the fact that the tank is full.

When the system is in operation, for the delivery of oil it is of course necessary to close the fill connection and also to close the tell-tale connection. I have preferably arranged in these connections valves I and J which are so connected to each other that the operation of one will cause the operation of the other, which will insure that both valves are closed at the same time.

As the pipe H of the tell-tale is normally filled with water it is necessary to provide it also with heat insulation, such as indicated at K.

What I claim as my invention is:

1. In a hydraulic oil storage and delivery system the combination with a tank, of a water conduit extending down through said tank to near the bottom thereof, and heat insulation surrounding said conduit and protecting the same from the oil.

2. In a hydraulic oil storage and delivery system the combination with a tank, of a water conduit extending downward through said tank, a pipe of larger dimensions surrounding said pipe, and heat insulation between said pipes.

3. In a hydraulic oil storage and delivery system the combination with a tank, of a water displacement connection extending downward through said tank, a tell-tale conduit normally filled with water and extending downward in said tank, and heat insulation surrounding each of said connections.

4. In a hydraulic oil storage and delivery system, the combination with a tank, of a fill connection for said tank, a water displacement connection extending downward through said tank to near the bottom thereof, a tell-tale connection extending downward through said tank to a point above the level of the water displacement connection, and the upper end thereof terminating below the hydrostatic level of the oil when the tank is filled, valves for respectively opening and closing the fill connection and tell-tale connection, and connections between said valves for compelling their simultaneous operation.

5. In a system for the hydraulic storage and delivery of oil, the combination with a tank, a fill connection therefor, a normally open low head water discharge connection and normally closed high head water connection, of a conduit connected with said tank with its lower end at a predetermined low level for the oil in said tank and its upper end at a level between said low head water discharge connection and the corresponding hydrostatic level of oil, a valve for opening and closing said conduit, a valve for controlling the filling of the tank with oil, and a connection between said valves for opening the valve in said conduit by the manipulation of the valve to permit the filling of the tank with oil.

In testimony whereof I affix my signature.

FREDERICK G. FARR.